United States Patent
Reed et al.

[11] Patent Number: 6,160,798
[45] Date of Patent: Dec. 12, 2000

[54] METHOD AND SYSTEM FOR MANAGING BASE STATION RESOURCES IN A CODE DIVISION MULTIPLE ACCESS CELLULAR COMMUNICATION SYSTEM

[75] Inventors: John Douglas Reed, Arlington; Jack Anthony Smith, Bedford, both of Tex.

[73] Assignee: Motorola, Inc., Schaumburg, Ill.

[21] Appl. No.: 09/207,222

[22] Filed: Dec. 8, 1998

[51] Int. Cl.[7] ................................................. H04Q 7/00
[52] U.S. Cl. .......................................... 370/331; 455/437
[58] Field of Search ...................................... 370/320, 331, 370/335, 342, 441, 328, 329, 336, 337, 341; 455/437, 438, 439, 442, 453, 436, 440

[56] References Cited

U.S. PATENT DOCUMENTS

| | | | |
|---|---|---|---|
| 5,245,629 | 9/1993 | Hall | 455/522 |
| 5,574,984 | 11/1996 | Reed et al. | 455/69 |
| 5,603,096 | 2/1997 | Gilhousen et al. | 455/69 |
| 5,666,356 | 9/1997 | Fleming et al. | 370/328 |
| 5,671,218 | 9/1997 | I et al. | 370/252 |
| 5,678,188 | 10/1997 | Hisamura | 455/509 |
| 5,781,542 | 7/1998 | Tanaka et al. | 370/342 |

*Primary Examiner*—Chau Nguyen
*Assistant Examiner*—Soon-Dong Hyun
*Attorney, Agent, or Firm*—L. Bruce Terry

[57] ABSTRACT

In a method for managing resources in a base station in a code division multiple access cellular communication, a resource shortage of a selected resource in a first base station is detected. Next, a subscriber unit having a communication link with the first base station is selected. Thereafter, a handoff direction message is sent to the selected subscriber unit to cause a second base station to contribute the selected resource, wherein the resource shortage in the first base station is alleviated. Resources that may experience shortages in the first base station include transmit power and available user spreading codes.

16 Claims, 3 Drawing Sheets

METHOD AND SYSTEM FOR MANAGING BASE STATION RESOURCES IN A CODE DIVISION MULTIPLE ACCESS CELLULAR COMMUNICATION SYSTEM

FIELD OF THE INVENTION

The present invention is related in general to wireless communications systems, and more particularly to an improved method and system for managing base station resources in a Code Division Multiple Access (CDMA) cellular communications system.

BACKGROUND OF THE INVENTION

Code Division Multiple Access (CDMA) is a modulation and multiple access scheme used for various communication applications, such as wireless personal communication systems and digital cellular telephony. For example, a CDMA cellular telephone system uses spread spectrum communication technology to separate one user's signal from another. Thus, as a user's or subscriber's signal is transmitted from a cellular system base station, the signals are distinguished at the subscriber unit by using a binary orthogonal spreading code, which may be based on Walsh functions (also known as Hadamard matrices).

In an IS-95 type cellular communications system (i.e., a communications system implemented according to Telecommunications Industry Association (TIA) Interim Standard (IS) 95, or the like), the Walsh function is 64 PN (pseudonoise) code chips long and represents 64 different orthogonal spreading codes. Even though other systems may use alternative spreading codes, the direct sequence spread spectrum communication system must agree upon a finite number of spreading codes that will be used to spread a signal at the base station and despread a signal at the subscriber unit.

In some instances, the number of spreading codes available is insufficient to handle the number of subscribers requesting a traffic channel from a base station. If the set of spreading codes at the base station is considered a resource that is allocated to subscribers that request a traffic channel, then a base station that runs low, or runs out of spreading codes, may be said to be resource limited because the number of available spreading codes has dropped below a predetermined threshold. When the base station runs out of spreading codes, a blocking situation exists wherein users requesting a traffic channel from the base station are denied access because spreading codes are not available.

Just as spreading codes are a resource at the base station, transmitter power is another base station resource that must be efficiently managed or allocated between users. Typically, base stations include a maximum power rating for the radio frequency power amplifier that amplifies the signals coupled to the base station antenna. Therefore, the total transmit power available at the base station must be efficiently divided among the various communication links between the base station and the subscribers receiving signals from the base station.

When power requested by subscriber units in a cell or sector approaches the maximum power available, the base station may be said to be power limited, in that the resource of transmit power is nearly exhausted. As a consequence of being power limited, the base station may enter a blocking situation wherein users desiring service through a traffic channel are denied access because the transmit power for supporting the channel is not available.

When cellular subscribers are blocked as described above, both the blocked subscriber and the cellular system operator are disappointed. The subscriber is disappointed because a call or data connection cannot be established or maintained, and the cellular system operator is disappointed because a subscriber is unhappy and the operator is denied the revenue that can be charged while the subscriber uses the system. Because of the problems caused by blocking when the resources in a base station are not properly managed, it should be apparent that a need exists for an improved method and system for managing base station resources in a code division multiple access cellular communication system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1 depicts a high-level schematic diagram of a cellular communication system that may be used to implement the method and system of the present invention;

FIG. 2 is a high-level flowchart illustrating the method of the present invention; and FIGS. 3 and 4 are graphs of pilot signal strength measurements and selected soft handoff parameters over time, in accordance with the method and system of the present invention.

DETAILED DESCRIPTION OF THE INVENTION

With reference now to the figures, and in particular with reference to FIG. 1, there is depicted a CDMA cellular telephone system. As illustrated, telecommunications system 20 includes base stations 22–26. Base stations 22–26 provide high quality, reliable communication links with subscriber units in coverage areas 28–32. Note that coverage areas 28–32 generally show the area of reliable signal coverage by base stations 22–26, respectively, wherein subscriber units in these areas are typically served by the base station in the same area. It should be noted that reliable communication links may, under certain circumstances, be established between a base station and a subscriber unit outside the coverage area shown for that base station. Such communication links with outside subscriber units may be established when parameters within the outside subscriber unit are set according to the present invention.

Subscriber units are shown generally in FIG. 1 with the symbol represented at reference numerals 34 and 36. The se subscriber units may be either mobile units or fixed, or relatively immobile units, which may also be referred to as fixed wireless terminals. Communications links, which are established between base stations and subscriber units, are shown generally with the symbol designated by reference numerals 38 and 40. According to the present invention, these are wireless communications links using digital spread spectrum communication techniques.

Figure 1:
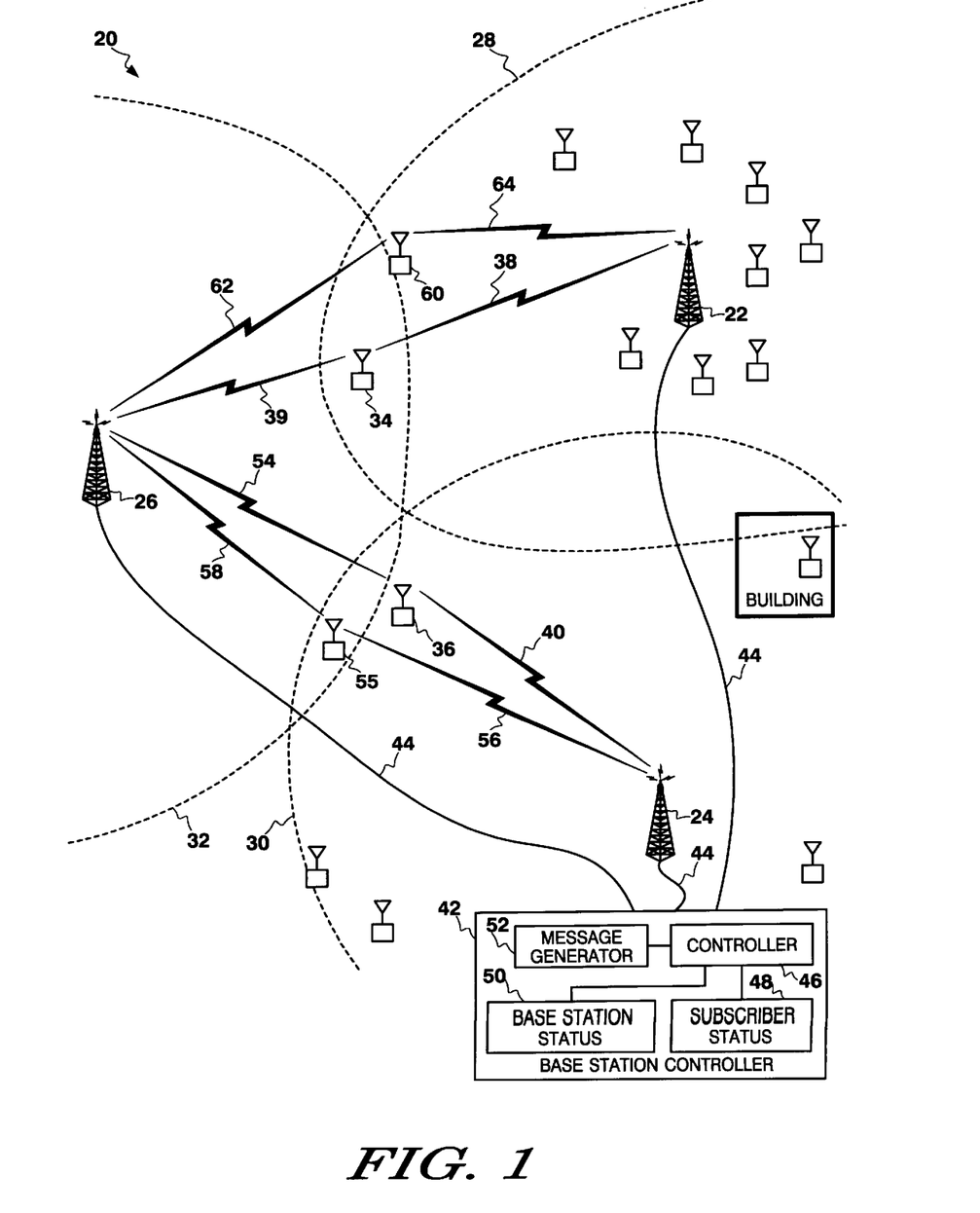

To control many aspects of the operation of telecommunications system 20, base station controller 42 is coupled to base stations 22–26 via backhaul communication links 44. Examples of tasks performed by base station controller 42 include registering users, completing calls, and managing the wireless communication links between base stations and subscriber units. In order to implement these functions, base station controller 42 includes controller 46, which is coupled to subscriber status database 48, base station status database 50, and message generator 52.

Controller 46 may be implemented with hardware and software that maintains databases 48 and 50 and instructs message generator 52 in the generation and reception of messages communicated to and from the subscriber units. Controller 46 may be implemented with a general purpose computer that executes appropriate software.

Subscriber status database 48 and base station status database 50 store data that represents current operating conditions and settings within telecommunication system 20. For example, subscriber status database 48 may store information representing measurements made by the subscriber unit and the current value of parameters set within the subscriber unit. Such subscriber measurements may include pilot signal strength measurements of pilot signals transmitted by selected base stations in telecommunication system 20.

The values of subscriber parameters stored in subscriber status database 48 may include values representing the status of active communication links, power allocated to the subscriber unit, and thresholds that trigger the subscriber unit to report to the base station. In an IS-95 type system, such thresholds may include soft handoff parameters that set reporting thresholds, such as T_add, T_drop, and T_comp. These soft handoff parameters control thresholds or conditions within the subscriber unit that are used to determine when the subscriber unit sends a reporting message to a base station and on to base station controller 42. Such messages send information relevant to the addition or elimination of communication links with the subscriber unit. Note that when the subscriber unit communicates with two or more communication links, the subscriber unit is said to be in "soft handoff." Soft handoff may exist between two or more base stations, or between two or more sectors on the same base station.

Base station status database 50 stores information indicating the current status and operating conditions of base stations 22–26. Such information may include the status and availability of resources at the base station. Such resources may include the current power allocation for each subscriber, the availability of transmitter power, and the current assignment and availability of user spreading codes, such as Walsh codes.

Message generator 52 generates outgoing messages for the subscriber unit, and receives and decodes incoming messages for base station controller 42. Messages received from subscriber units include signal strength messages, status messages, and messages used in adding or eliminating communication links with the subscriber unit.

Figure 2:
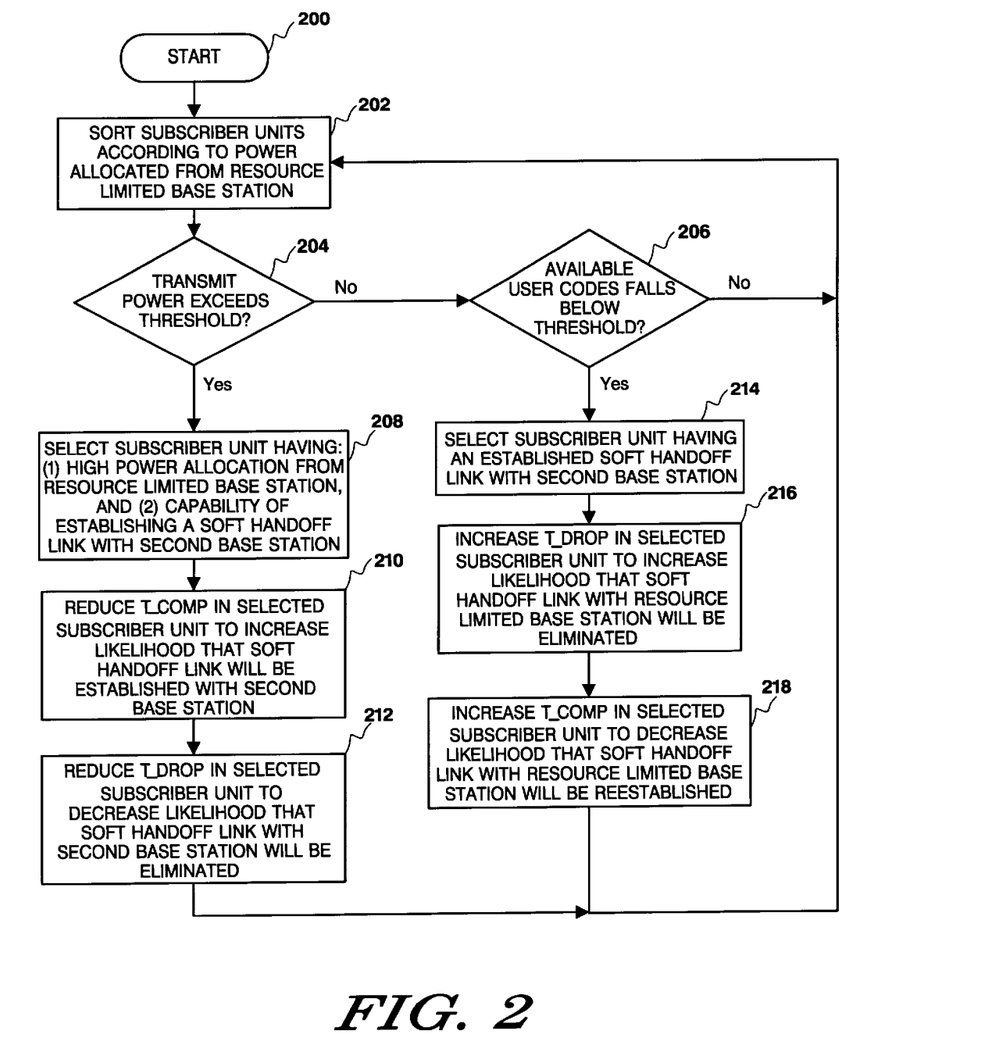

With reference to FIG. 2, there is depicted a high-level logical flowchart of the process of managing base station resources according to the method and system of the present invention. As illustrated, the process begins at block 200, and thereafter passes to block 202 wherein the process sorts subscriber units according to transmit power allocated from a resource limited base station. A resource limited base station is one that has reached a threshold for allocation of a base station resource. Base station resources may include transmitter power and user spreading codes. The purpose of this sort is to increase the efficiency of selecting a subscriber unit that may be able to share a resource with a second base station.

Next, the process determines whether or not total allocated transmit power exceeds an allocated power threshold in a resource limited base station, as illustrated at decision block 204. If allocated transmit power does not exceed the allocated power threshold, the process continues at decision block 206. If, however, the allocated transmit power exceeds the allocated power threshold, a resource shortage has been detected in the resource limited base-the resource limited base station is power limited. To determine whether or not a base station is power limited, controller 46 may monitor data stored in base station status data base 50, and compare the total power requested from each base station to a base station allocated power threshold.

In a preferred embodiment, the allocated power threshold is set to a percentage of the maximum transmit power of the base station power amplifier, or to a percentage of the maximum power available for all subscriber units in the coverage area served by the resource limited base station.

Once a power resource shortage is detected, the process selects a subscriber unit having: (1) a high power allocation from the resource limited base station, and (2) the capability of (establishing a communication link (i.e., a soft handoff link) with a second base station, as depicted at block 208. Preferably, the second base station is one that is not similarly limited. That is, in this case, one that is not similarly power limited. The second base station should be one able to contribute transmit power to alleviate the transmit power resource shortage in the first base station.

A subscriber unit with a high power allocation is a likely candidate for selection because it will probably be able to establish a communication link with a second base station, and it is more likely that the second base station will contribute a larger amount of power to that subscriber, thereby allowing the resource limited base station to reduce power allocated to the subscriber by a greater amount.

Additionally, it may be preferable to select a fixed wireless terminal before selecting a high mobility subscriber unit since the fading characteristics of signals received by the fixed wireless terminal are more stable than those characteristics; in a faster moving, higher mobility subscriber unit.

After the subscriber unit is selected, the proces3 reduces the reporting threshold, such as the value of T_comp or T_add, in the selected subscriber unit in order to increase the likelihood that a reporting message will be sent from the subscriber unit, and, as a result, increase the likelihood that a soft handoff link will be established with the second base station, as illustrated at block 210. T_comp may be defined as a value by which a candidate pilot signal strength must exceed an active pilot signal strength before causing a reporting message to be sent to the base station for the purpose of adding a soft handoff communication link. The likelihood that a soft handoff link will be established with a second base station is increased because the signal strength of a second pilot from the second base station need not be as strong as before the reduction of T_comp, which causes the subscriber unit to more quickly report the possibility that a soft handoff link may be established between the subscriber unit and the second base station.

After reducing T_comp, the process reduces a reporting threshold, such as T_drop, in the selected subscriber unit to decrease the likelihood that a reporting message will be sent from the subscriber unit, and, as a result decrease the likelihood that a soft handoff link with the second base station will be eliminated, as depicted at block 212. T_drop may be defined as the value below which an active set pilot must fall, for a preset duration, before a reporting message is sent to the base station for the purpose of removing a soft handoff communication link. The likelihood that a soft handoff link with the second base station will be eliminated is decreased because the signal strength of the second pilot signal is allowed to drop or fade lower before crossing the new threshold, which makes it less likely to trigger a report that may result in the removal of the newly established soft handoff link with the second base station.

In a preferred embodiment, the reporting thresholds in the subscriber units are changed with messages from base station controller 42 specifically directed to the selected subscriber unit, such as subscriber unit 36. The addition or elimination of soft handoff links with the second base station may similarly be implemented with a message to the selected subscriber unit. An example of a message instructing a subscriber unit to add or eliminate a soft handoff link is the "handoff direction message" as defined in IS-95. This message changes the members of the active set in the subscriber unit. The active set is the set of pilots associated with the CDMA channels containing forward traffic channels assigned to a particular subscriber unit.

In an alternative embodiment, a resource limited base station may broadcast a message to change reporting thresholds in all subscriber units in a coverage area. Rather than alleviating the resource shortage one subscriber at a time, this broadcast should result in establishing of soft handoff links with all subscriber units that meet the new criteria.

Figure 3:
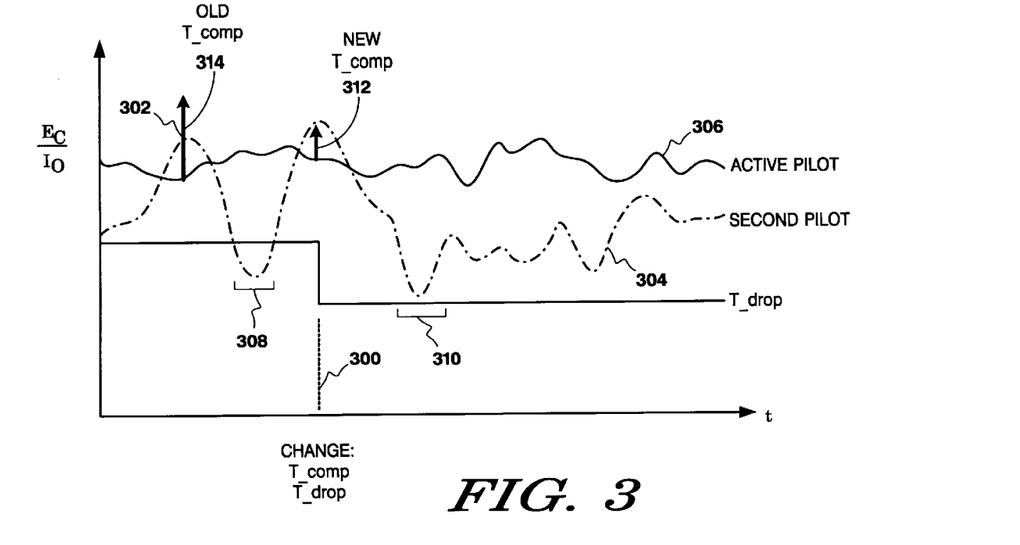

The change in reporting thresholds, and the effects of the change, are more clearly illustrated in FIG. 3, wherein FIG. 3 depicts a graph of pilot signal strengths, represented as $E_C/I_O$ (Energy per chip divided by total noise power spectral density) on the vertical axis, versus time, represented along the horizontal axis. At time 300, both T_comp and T_drop are reduced in accordance with the steps shown in blocks 210 and 212 of FIG. 2.

At time 302, which is prior to changing T_comp, the strength of second pilot 304 does not exceed the strength of active pilot 306 by the value of Old T_comp 314. Therefore, before the change, the subscriber unit would not report this signal strength condition for the purpose of adding a soft handoff link with the second base station because second pilot strength 304 did not exceed active pilot strength 306 by a value greater than Old T_comp 314.

After the change, second pilot strength 304 exceeds active pilot strength 306 by a value greater than New T_comp 312, as shown at time 300. As a result of changing the reporting criteria, the subscriber unit is more likely to report the signal strength of second pilot 304, which initiates the addition of a soft handoff link with a second base station.

Before time 300, a soft handoff link with the second base station would likely be dropped during period 308 a, second pilot strength 304 falls below the old value of T_drop. After time 300, T_drop is reduced so that similar reductions in second pilot strength 304 will not cause a report that initiates dropping the newly added soft handoff link with the second base station, which may otherwise have occurred during period 310.

To summarize FIG. 3, the reduction of T_comp and T_drop work together to make it more likely that the selected subscriber unit will report conditions that cause base station controller 42 to establish a soft handoff link with the second base station, and further making it less likely that the subscriber unit will report a condition that causes the new soft handoff link with the second base station to be eliminated as the second pilot strength fluctuates over time.

Note that in many embodiments of telecommunications system 20, base station controller 42 responds to a signal strength report from a subscriber unit by replying with a handoff direction message to add or delete a member of the active set, which adds; or deletes a soft handoff link with the subscriber unit. The reason for the response of adding or deleting links is that the base station controller 42 has preferably set the reporting thresholds to the thresholds for adding and deleting soft handoff links, which is convenient because subscriber reports are made when adding or deleting links is prescribed, rather than adding or deleting links when the pilot signal strengths meet some criteria other than the reporting criteria.

Referring again to FIG. 1 to further illustrate the example above, subscriber unit 36 is served by communication link 40 from base station 24, a base station which may be short of a transmit power resource because most of the subscriber units in coverage area 30 are far away from base station 24 and have probably been allocated relatively high amounts of transmit power. According to the present invention, subscriber unit 36 may be selected to have soft handoff parameters adapted so that subscriber unit 36 establishes a soft handoff link with a second base station, base station 26, which is not power limited. By sending a handoff direction message to subscriber unit 36 to establish communication link 54 as a soft handoff link with base station 26, base station 26 contributes transmit power to subscriber unit 36. Now base station 24 does not need to provide all of the required power to subscriber unit 36 for maintaining reliable communications, and the power allocated to communication link 40 may be reduced to alleviate the transmit power resource shortage at base station 24.

Returning now to decision block 206, wherein the process determines whether or not the number of available user spreading codes falls below a threshold in order to detect a resource shortage of available user spreading codes in a resource limited base station. In a preferred embodiment, a user spreading code is available in a base station if it may be allocated to support a new communications link. If the number of available spreading codes does not fall below a threshold, the process iteratively returns to block 202 to update the sorting of subscriber units and to continue checking of resources in the base station.

If the number of available user spreading codes falls below a threshold, the process selects a subscriber unit having an established soft handoff link with a second base station, as depicted at block 214. Preferably, the second base station is not similarly spreading code limited. In selecting the subscriber unit, it may be useful to examine the subscriber list that is sorted in order of power allocated from the resource limited base station. Subscriber units having higher power allocation are also more likely to have an established soft handoff link because they are probably near the edge of the coverage area. If more than one subscriber unit is already in soft handoff with the second base station, the selected subscriber unit is preferably the one having the lowest signal strength from the resource limited base station because this subscriber unit will be least affected by eliminating a lower-power soft handoff communication link with the resource limited base station.

Once the subscriber unit has been selected, the process then increases reporting thresholds, such as T_drop, in the selected subscriber unit to increase the likelihood that that a reporting message with be sent from the subscriber unit, and, as a result, increase the likelihood that the soft handoff link with the resource limited base station will be eliminated, as illustrated at block 216. Thereafter, the process increases the T_comp reporting threshold in the selected subscriber unit in order to decrease the likelihood that the soft handoff link with the resource limited base station will be reestablished, as depicted at block 218.

Figure 4:
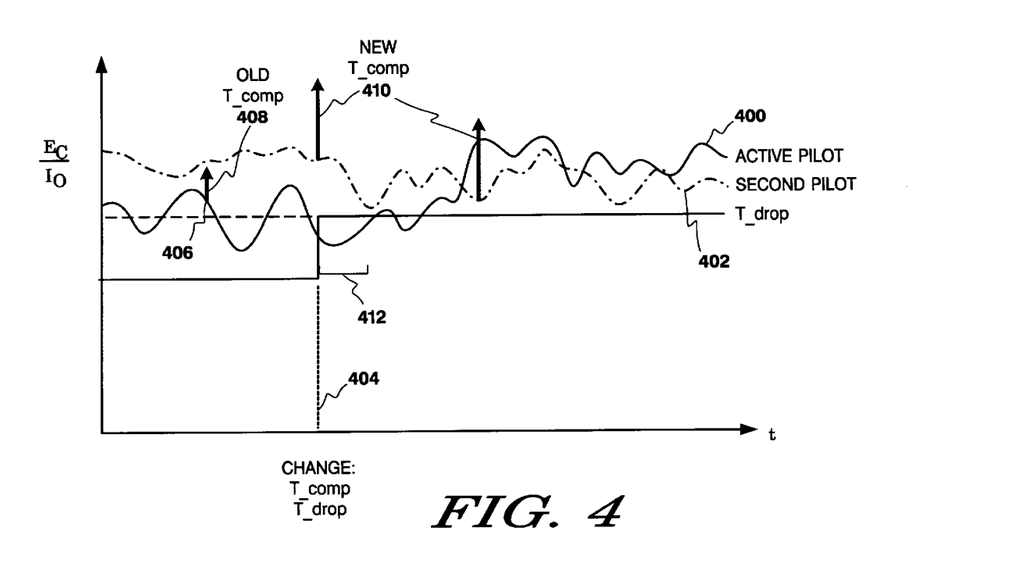

These increases in T_drop and T_comp, and their effects, may be more clearly understood with reference to FIG. 4, wherein active pilot signal strength 400 and second pilot signal strength of 402 from a second base station are graphed with respect to time. At time 404, the values of reporting thresholds T_comp and T_drop are both increased.

At time 404, the value of reporting threshold T_drop is increased for the purpose of increasing the likelihood that the subscriber will report a condition which leads to the soft handoff link with the resource limited base station being eliminated with a handoff direction message instructing the selected subscriber unit to drop that communication link. As shown in time period 412, second pilot strength 402 falls below reporting threshold T_drop for a time that satisfies a reporting condition for eliminating a soft handoff communication link with the spreading code limited base station. By eliminating the soft handoff link with the selected subscriber unit, the resource limited base station has now increased the number of available spreading codes, thereby alleviating the spreading code resource shortage.

As shown at time 406, Old T_comp 408 has been set to a value wherein a report from the subscriber was made, and, as a result, a communication link from the second base station has already been added because second pilot strength 402 exceeds active pilot strength 400 by a value greater than old T_comp 408.

At time 404, the value of T_comp is increased from Old T_comp 408 to the value of New T_comp 410. The increased value of reporting threshold New T_comp makes it less likely that a report is made to cause a soft handoff link to be reestablished with the resource limited base station. Thus, increasing the reporting threshold T_comp makes it less likely that the newly available spreading code will be reallocated to the selected subscriber unit.

Referring again to FIG. 1 to further illustrate the example above, subscriber unit 34 is served by communication links 38 and 39 from base stations 22 and 26, wherein base station may be short of available user spreading codes because it has established communication links (not shown) with the many subscriber units in coverage area 28. According to the present invention, subscriber unit 34 may be selected to have soft handoff parameters adapted so that subscriber unit 34 removes a soft handoff link with the resource limited base station, base station 22. After removing communication link 38, selected subscriber unit 34 is served by communication link 39 from second base station 26, which is not resource limited because it has many available user spreading codes. By sending a handoff direction message to subscriber unit 34 to remove communication link 38 as a soft handoff link with base station 22, subscriber unit 34 receives all of its signal power from base station 26, and base station 22 is able to increase the number of available user spreading codes by one. In essence, a second base station, base station 26, has contributed a resource, an available spreading code, to resource limited base station 22.

In the description above, base station 26 contributes power to power limited base station 24 by adding soft handoff link 54 to contribute power to subscriber unit 36, and thereby reduce the power required in communication link 40. In another example of contributing power to power limited base station 24, subscriber unit 55 may be selected for receiving the handoff direction message so that base station 26 can contribute power.

In this example, assume that subscriber unit 55 has already established soft handoff links 56 and 58, with base stations 24 and 26, respectively. Messages sent to subscriber unit 55 may include a message to increase T_drop to make it more likely that subscriber unit 55 will send a reporting message and base station controller 42 which leads to the elimination of communication link 56. If communication link 56 is eliminated, subscriber unit 55 will likely request additional power from base station 26. As a result, base station 26 effectively contributes more power to subscriber unit 55, thus alleviating the power required from power limited base station 24 to support communication link 56.

In summary, power may be shared between base stations by establishing soft handoff links, such as communication link 54, where none existed previously, or eliminating soft handoff links, such as communication link 56, where a subscriber unit is already in soft handoff communication between two base stations.

In another example of contributing a spreading code resource, subscriber unit 60, which was not previously communicating with base station 26, may have reporting thresholds changed and may receive instructions o add communication link 62 to supplement communication link which already exists. Once communication link 62 is established subscriber unit 60 may then be sent messages that result in the elimination in communication link 64, effectively contributing a spreading code to the list of available spreading codes at spreading code limited base station 22.

In summary, spreading code limited base station 22 may encourage subscribers such as subscriber unit 34, to drop a soft handoff communication link 38, or alternatively encourage a subscriber unit, such as subscriber unit 60, to establish a soft handoff communication link, such as communication link 62, and drop and existing communication link, such as communication link 64.

In other embodiments of the present invention, subscriber unit reporting criteria and thresholds for sending messages for the purpose of adding or removing soft handoff communication links may be different. For example, IS-95 type systems may operate in two soft handoff modes: a me called "T_comp mode," and a mode called "T_add mode." In T_comp mode, which has been described herein in relation to FIGS. 3 and 4 above, soft handoff communication links are typically added when pilot signal strengths have relative differences exceeding a threshold. In T_add mode, soft handoff communication links are typically added when candidate pilot signal strengths exceed a threshold having an absolute value.

In addition to comparing relative signal strengths or comparing absolute signal strengths, some communication systems may use a mathematical combin ion of parameters scaled by coefficients, wherein the coefficients may be set by messages from base station controller 42. Mathematical formulas may define more complex relationships between various conditions in the subscriber unit, including pilot strength measurements and their relationships with each other and the noise floor.

In the examples discussed above, a second base station contributes resources to a resource limited base station, wherein the resources contributes power and spreading codes. Contribution of other resources may include contribution of services provided by hardware. For example, base stations typically include a limited number of trancoder cards, which are required to support voice communication links. Similarly, each base station backhaul communication link has a capacity to support a finite number of calls. If one base station has a shortage of available transcoder cards, or a shortage a available backhaul capacity, the method and system of the present invention may be used to cause a second base station to contribute the selected resource in order to provide service to the subscriber unit.

While the examples discussed above describe base stations that omnidirectionally service an entire coverage area or cell, the present invention may be used to share resources between sectors of a cell in a sectorized ellular communications system. If cells are divided into sectors, each sector may be considered a base station, such as base stations 21–26. Thus, for the purpose of applying the teachings of the present invention in a sectorized system, each sector may be considered a b se station.

The foregoing description of a preferred embodiment of the invention has been presented for the purpose of illustration and description. It is no intended to be exhaustive or to limit the invention to the precise form disclosed. Modifications or variations are possible in light the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for managing resources in a base station in a code division multiple access cellular communication system, the method comprising the steps of:
    detecting a resource shortage of a selected resource in a first base station in the communication system;
    selecting a subscriber unit having a communication link with the first base station;
    changing a message reporting threshold in the selected subscriber unit; and
    sending a handoff direction message to the selected subscriber unit to cause a second base station to contribute the selected resource, wherein the resource shortage in the first base station is alleviated.

2. The method for managing resources in a base station according to claim 1 wherein the step of detecting a resource shortage of a selected resource in a first base station further includes detecting a power shortage of transmit power in a first base station.

3. The method for managing resources in a base station according to claim 2 wherein the step of detecting a power shortage of transmit power in a first base station further includes determining that a total power requested from subscriber units from the first base station exceeds a threshold.

4. The method for managing resources in a base station according to claim 1 wherein the step of detecting a resource shortage of a selected resource in a first base station further includes detecting a user spreading code shortage of available user codes in a first base station.

5. The method for managing resources in a base station according to claim 4 herein the step of detecting a user spreading code shortage of available user codes in a first base station further includes determining that a number of available Walsh codes falls below a minimum Walsh code threshold.

6. The method for managing resources in a base station according to claim 1 wherein the step of changing a message reporting threshold in the selected subscriber unit further includes instructing a selected subscriber unit to change a soft handoff parameter that increases the likelihood that the selected subscriber unit will report a specified pilot signal strength condition.

7. The method for managing resources in a base station according to claim wherein the step of instructing a selected subscriber unit to change a soft handoff parameter further includes instructing a selected subscriber unit to change a soft handoff parameter that increases the likelihood that a soft handoff link with the first base station will be eliminated, wherein a user spreading code contributed by the second base station to the selected subscriber unit makes available a subscriber spreading code in the first base station.

8. The method for managing resources in a base station according to claim 6 wherein the step of instructing a selected subscriber unit to change a soft handoff parameter further includes instructing a selected subscriber unit to change a soft handoff parameter that increases the likelihood that a soft handoff link with the second base station will be added, wherein transmit power contributed by the second base station to the selected subscriber reduces transmit power required from the first base station.

9. A system for managing resources in a base station in a code division multiple access cellular communication system:
   means for detecting a resource shortage of a selected resource in a first base station in the communication system;
   means for selecting a subscriber unit having a communication link with the first base station;
   means for changing a message reporting threshold in the selected subscriber unit; and
   means for sending a handoff direction message to the selected subscriber unit to cause a second base station to contribute the selected resource, wherein the resource shortage in the first base station is alleviated.

10. The system for managing resources in a base station according to claim 9 wherein the means for detecting a resource shortage of a s elected resource in a first base station further includes means for detecting a power shortage of transmit power in a first base station.

11. The system for managing resources in a base station according to claim 10 wherein the means for detecting a power shortage of transmit power in a first base station further includes means for determining that a total power requested from subscriber units from the first base station exceeds a threshold.

12. The system for managing resources in a base station according to claim 9 wherein the means for detecting a resource shortage of a selected resource in a first base station further includes means for detecting a user spreading code shortage of available user codes in a first base station.

13. The system for managing resources in a base station according to claim 12 wherein the means for detecting a user spreading code shortage of available user codes in a first base station further includes means for determining that a number of available Walsh codes falls below a minimum Walsh code threshold.

14. The system for managing resources in a base station according to claim 9 wherein the means for changing a message reporting threshold in the selected subscriber unit further includes means for instructing a selected subscriber unit to change a soft handoff parameter that increases the likelihood that the selected subscriber unit will report a specified pilot signal strength condition.

15. The system for managing resources in a base station according to claim 14 wherein the means for instructing a selected subscriber unit to change a soft handoff parameter further includes means for instructing a selected subscriber unit to change a soft handoff parameter that increases the likelihood that a soft handoff link with the first base station will be eliminated, wherein a user spreading code contributed by the second base station to the selected subscriber unit makes available a subscriber spreading code in the first base station.

16. The system for managing resources in a base station according to claim 14 wherein the means for instructing a selected subscriber unit to change a soft handoff parameter further includes means for instructing a selected subscriber unit to change a soft handoff parameter that increases the likelihood that a soft handoff link with the second base station will be added, wherein transmit power contributed by the second base station to the selected subscriber reduces transmit power required from the first base station.

* * * * *

UNITED STATES PATENT AND TRADEMARK OFFICE
CERTIFICATE OF CORRECTION

PATENT NO. : 6,160,798
DATED : December 12, 2000
INVENTOR(S) : Reed et al.

Page 1 of 1

It is certified that error appears in the above-identified patent and that said Letters Patent is hereby corrected as shown below:

Column 10,
Line 58, insert the number -- 6 -- after "claim"

Column 11,
Line 29, reads "s elected", should be -- selected --

Signed and Sealed this

Second Day of April, 2002

Attest:

JAMES E. ROGAN
Attesting Officer   Director of the United States Patent and Trademark Office